United States Patent [19]

Muller

[11] 4,326,956
[45] Apr. 27, 1982

[54] BACKWASHABLE FILTER SYSTEM
[75] Inventor: Otto Muller, Zurich, Switzerland
[73] Assignee: Sulzer Brothers Limited, Winterthur, Switzerland
[21] Appl. No.: 194,478
[22] Filed: Oct. 6, 1980
[30] Foreign Application Priority Data
  Nov. 5, 1979 [CH] Switzerland .................. 9900/79
[51] Int. Cl.³ ............................................ B01D 23/24
[52] U.S. Cl. .................................................. 210/277
[58] Field of Search ................ 210/275, 277, 276, 279
[56] References Cited
  U.S. PATENT DOCUMENTS 591,006  10/1897  Parsons ........................... 210/275 X
  2,384,972  9/1945  Smalley ........................... 210/275 X
  4,118,322  10/1978  Roman ............................ 210/275 X
  4,187,175  2/1980  Roberts et al. ................... 210/275 X Primary Examiner—John Adee
Attorney, Agent, or Firm—Kenyon & Kenyon

[57] ABSTRACT

The sludge water valve for closing the opening communicating with a sludge water discharge channel is disposed in that surface of the side wall of the excess head chamber which is near the solid bed of the filter system and is adapted to open with a hinging movement around a pivot extending substantially at the height of the solid bed along the bottom edge of the valve lid.

The discharge rate of the water in the excess head chamber is controlled, and discharge of granular material forming the bed prevented, by the lid being opened stepwise. The top edge of the lid forms a weir edge for the water layer which is immediately above the bed. Consequently, the residual column of the water in the excess head chamber is reduced for the air phase of backwashing.

8 Claims, 4 Drawing Figures

BACKWASHABLE FILTER SYSTEM

This invention relates to a backwashable filter system. More particularly, this invention relates to a backwashable filter system for the conditioning of liquids.

Heretofore, it has been known to construct backwashable filter systems with solid beds of granular material for the conditioning of a liquid. Generally, these granular systems have to be backwashed in order to remove impurities and dirt which have been separated out into the granular composition. This backwashing is usually performed in three phases using air and water in counter-current to the filtration direction. If backwashing proceeds vertically upwards, the dirt separated out in the granular composition during filtration is washed out into an excess head chamber above the solid bed. The washing liquid which then contains the impurities and which is hereinafter termed the "sludge water" must then be removed from the filter system. To this end, it has been known to provide the filter system with an opening in a sidewall of the excess head chamber and a sludge water discharge channel for receiving the sludge water from the excess head chamber via the opening. Usually, this opening is closed by a valve which can be opened and closed from time to time.

Filter systems of the above type are described, for example in the following publications: F. Lipp and H. Kubli "Seewasserwerk fur Trinkwasserversorgung der Stadt Biel", "Sulzer Technische Rundschau" (STR), 58, (1976), Heft 1, pp. 19–27, more particularly FIG. 3 on p. 2, and F. Lipp "Entsaeurungsanlage "Massagno" fur die Wasserversorgung der Stadt Lugano" STR 54, (1972), Heft 3, pp. 208–212, more particularly FIG. 4 on p. 211.

The first phase of three-phase backwashing or scavenging, known as the break-up phase, uses air and is, of course, most effective if the water level in the excess head chamber is as low as possible above the solid bed. Consequently, the opening to the sludge water discharge channel and, therefore, the sludge water valve need to be disposed very close above the solid bed. In this case, the freeboard i.e., the distance between the top edge of the solid bed and the bottom edge of the opening into the sludge water discharge channel, is very small.

The conventional sludge water valve constructions disclosed by the publications mentioned call for a relatively substantial freeboard of the order of from 300 to 500 millimeters (mm) to ensure, that grains of the filter material are not carried along and discharged, particularly when light granular materials are used and the sludge water discharges rapidly. However, a high freeboard contradicts the requirements outlined above for the first backwashing phase. Also, if the freeboard is substantial, the impurities washed out of the solid bed must be discharged over the relatively high bottom edge of the opening. Thus, the consumption of backwashing water is increased.

Accordingly, it is an object of the invention to provide a backwashable filter system having a sludge water valve in which the freeboard is at a minimum while the risk of discharging granular material from a solid filter bed is minimized.

It is another object of the invention to provide a backwashable filter system wherein a granular filter bed can be efficiently backwashed.

It is another object of the invention to use a minimum of water for backwashing the filter bed of a granular filter system.

It is another object of the invention to minimize the risk of washing out the granular medium of a granular filter bed of a filter system during backwashing.

Briefly, the invention provides a backwashable filter system which is comprised of a basin which defines an excess head chamber and a sludge water channel with a wall separating the chamber from the channel and an opening in the wall between the chamber and the channel. In addition, at least one granular filter bed is disposed in the basin below the excess head chamber with an upper surface in a plane below the opening to the sludge water discharge channel while a valve is positioned to selectively close the opening. In accordance with the invention, the valve has a lid which is disposed in front of the opening and which is pivotally mounted on an axis extending at least substantially in the plane of the upper surface of the filter bed along a bottom of the lid.

The lid of the sludge water valve, when in an partly open position, forms a kind of weir for the water discharging from the excess head chamber. Consequently, any granular material eddied up by the discharging water must pass over the weir before being discharged from the chamber. The level heights of the opening and of the fully opened valve—which height determines the height of the residual water column which is present during the first phase of a three-phase backwashing and through which air has to penetrate—is considerably less than the freeboard of previously known constructions.

The filter system may also be provided with means for hinging the lid about the pivot axis in steps. This allows the velocity which causes eddying of the granular material and at which the discharging water flows in the excess head chamber to be reduced. Consequently, if the level of water in the excess head chamber is high, the valve needs to be opened only slightly. Thus, because of the restriction at the partly opened valve, the rates of water flow in the excess head chamber are reduced. Simultaneously, there is a high "weir" for the granular material at the top edge of the valve lid. This high "weir" has the same effect as the high freeboard of a conventional construction. The lid can be further opened in a step-wise manner in order to open the valve further as the water level drops. However, this does not cause the velocity at which the water flows above the granular material of the solid bed to increase sufficiently to eddy the grains of the filter bed and carry the grains away.

In order to obviate even minor losses of granular material by way of the lateral ends of the valve, means are provided for sealing the lid laterally relative to the wall during movement of the lid from the opening.

These and other objects and advantages of the invention will become more apparent from the following detailed description taken in conjunction with the accompanying drawings wherein.

Figure 1:
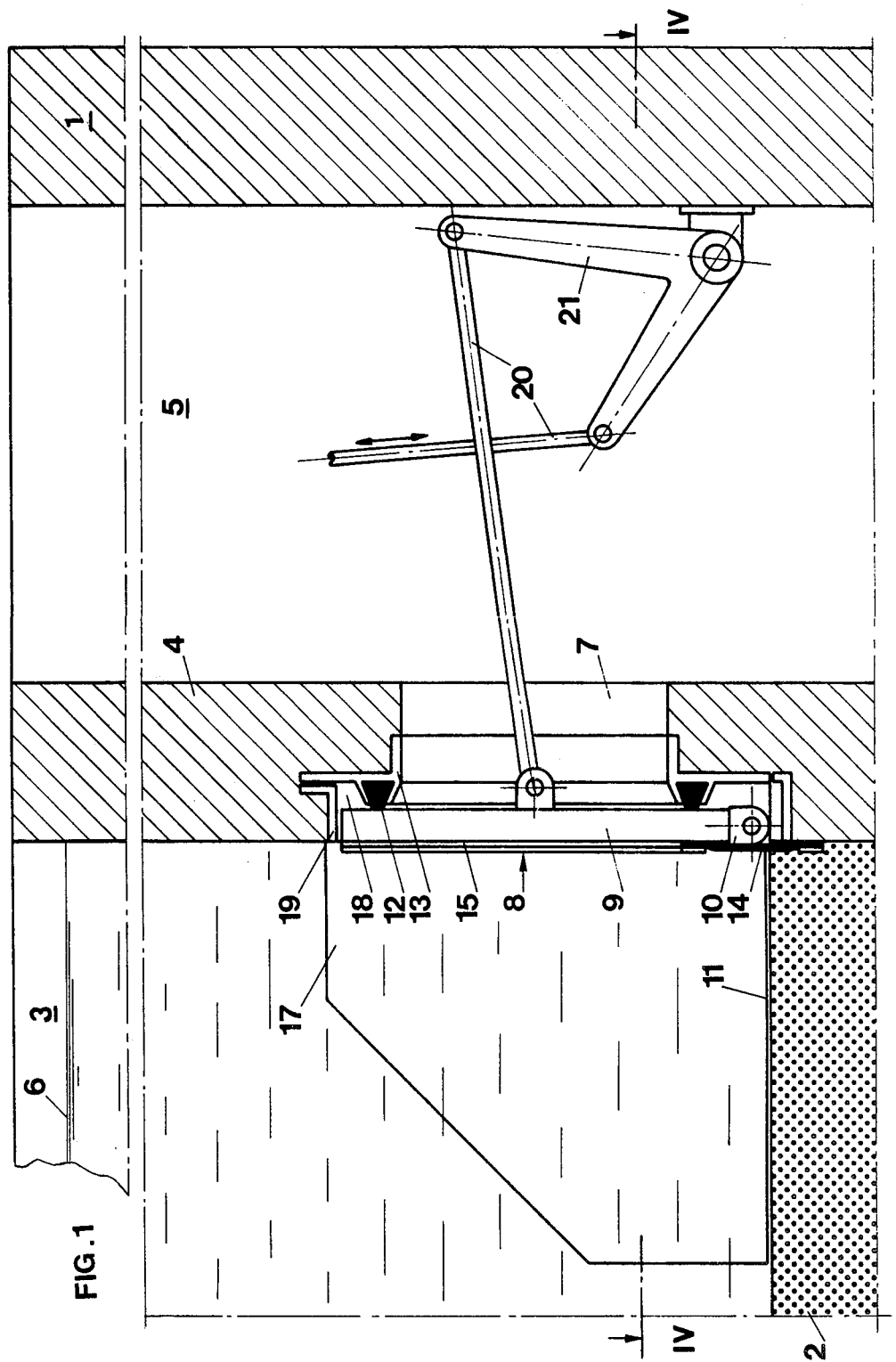
FIG. 1 illustrates a diagrammatic side view of a backwashable filter system constructed in accordance with the invention.

Referring to FIG. 1, the backwashable filter system, for example for water filtration, has at least one basin 1 which is made, for example of concrete. The basin 1 has a solid filter bed 2 formed of granular material located on a base (not shown) of the basin 1 and a wall 4 which separates an excess head chamber 3 above the filter bed 2 from a sludge water discharge channel 5.

The excess head chamber 3 receives either raw water to be filtered or sludge water for scaveging up to a level 6 while the discharge channel 5 serves to remove the sludge water during backwashing.

The wall 4 has an opening 7 between the chamber 3 and the channel 5 which extends over the whole length of the wall 4 and is of rectangular shape.

In addition, a valve 8 is disposed in the wall 4 for selectively closing the opening 7. As indicated, the valve 8 is disposed in the wall surface near the excess head chamber 3. The valve 8 includes a lid 9 of rectangular shape which is disposed in front of the opening 7 and which is pivotally mounted on an axis defined by a pivot 10 which extends along a bottom of the lid 9 so as to pivot between a position within the wall 4 near the excess head chamber 3 and in front of the opening 7 and a position spaced from the wall 4. The axis of the pivot 10 is also disposed at least substantially in the plane of the upper surface 11 of the filter bed 2.

Figure 4:
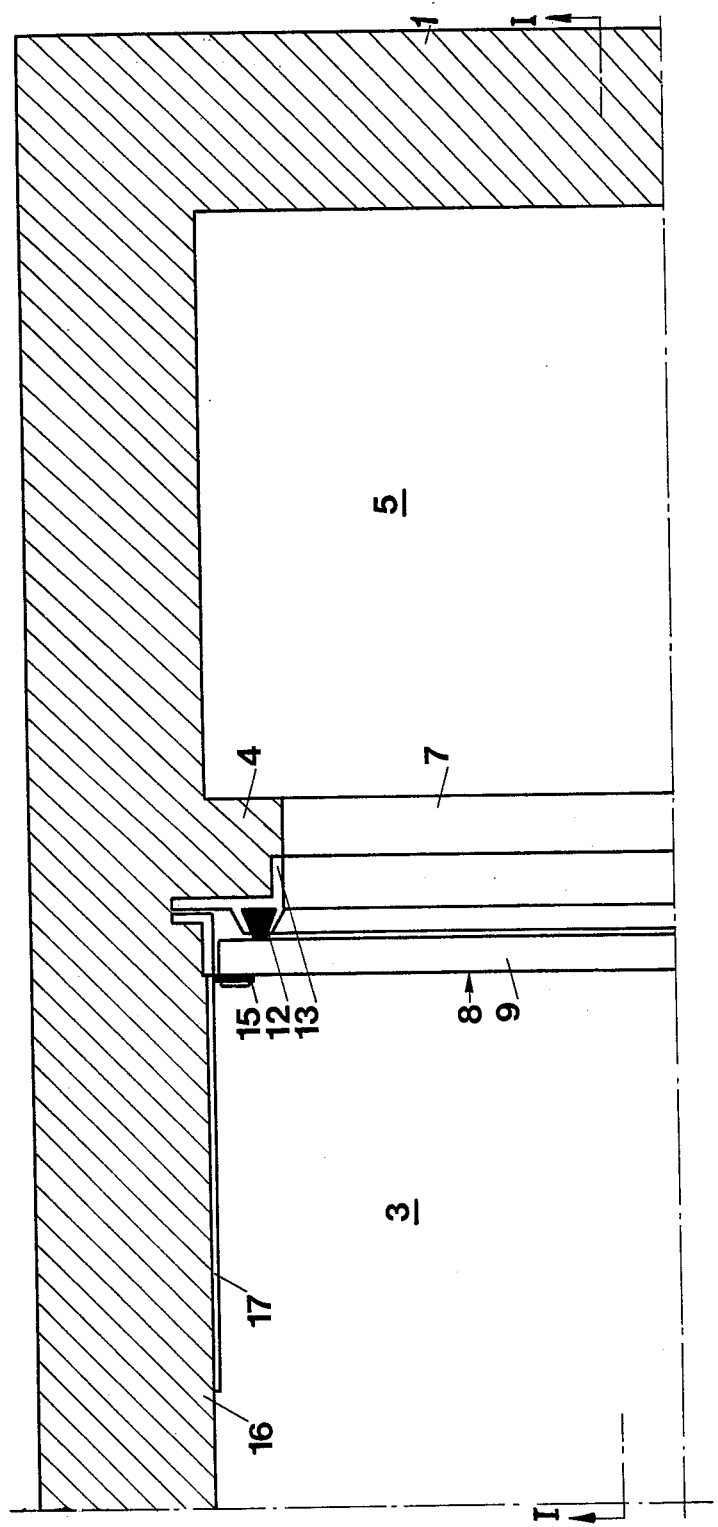
FIG. 4 illustrates a view taken on line IV—IV of FIG. 1.

Referring to FIGS. 1 and 4, a sealing means 12 is disposed in a frame 13 about the opening 7 in order to seal against the lid 9 when the lid 9 is in a closed position. The frame 13 can be secured in the wall 4 in any suitable manner.

Additional sealing means 14, 15 are also provided along the bottom edge and lateral ends of the lid 9. As shown in FIGS. 1 and 4, the sealing means 15 are in the form of flexible seals made of flexible elastomers, such as rubber, for sealingly contacting sidewalls 16 of the basin 1 which are perpendicular to and integral with the respective ends of the wall 4. These sealing means 15 are sufficiently resilient to form an effective seal to seal the lid 9 laterally relative to the wall 4 during movement of the lid 9 from the opening 7 over the entire range of opening of the lid 9. In order to reduce friction between the sealing means 15 and the walls 16, the walls 16 are covered with a metal member 17 in the region of movement of the lid 9.

Referring to FIG. 1, the valve lid 9 is received in a recess 18 of the wall 4 which is larger than the opening 7. This recess 18 also receives the sealing means 12 and the frame 13 and is enclosed by a frame 19 relative to the basin walls 4, 16.

A suitable means for hinging the lid 8 about the axis of the pivot 10 is also provided. This means includes a linkage 20 and a double armed lever 21 which is mounted on a sidewall of the basin 1. The linkage 20 can be connected to an electric stepping motor or a hydraulic and/or pneumatic servo-motor which is appropriately programmed to open the lid 9 in steps. Such a motor or servo-motor can be provided in a control system (not shown) for the filter system. Such a control system controls, inter alia, backwashing of the filter system automatically in a known manner.

Figure 2:
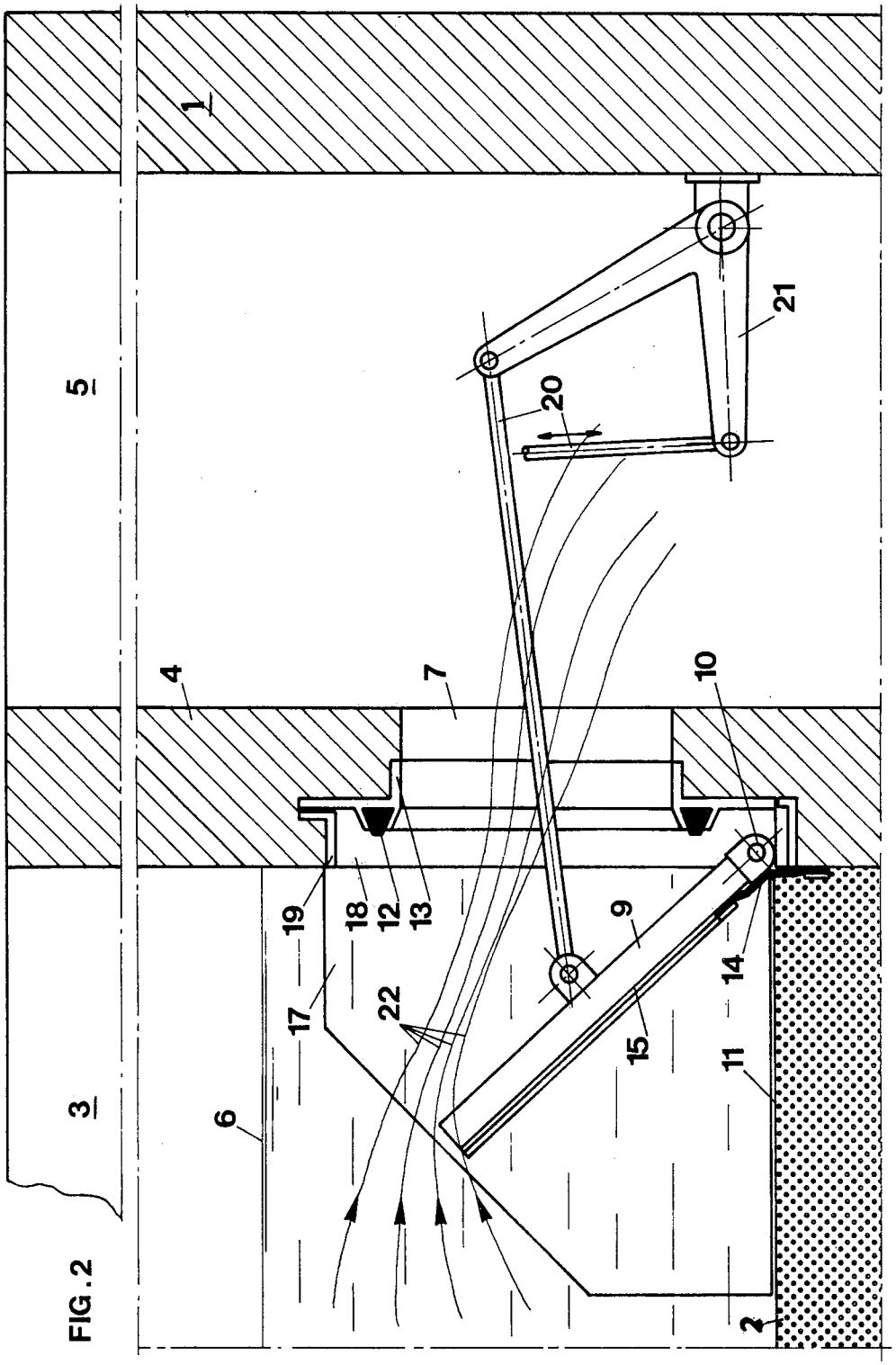
FIG. 2 illustrates a view similar to FIG. 1 with a valve lid in a partially opened condition.

In operation, as shown in FIG. 1, with sludge water in the excess head chamber 3 at the level 6 with the valve 8 closed and with the solid bed 2 completely flooded, the control system (not shown) activates the linkage 20 so that the valve lid 9 is hinged about the pivot 10 into a partially opened position as shown in FIG. 2. At this time, the water above the level of the lid 9 flows out of the chamber 3 through the opening 7 into the channel 5. As indicated, the water flows along the flow lines 22 over the top edge of the lid 9 such that the lid 9 acts as a weir. This enables the rate of flow of the water in the chamber 3 above the bed 2 to be maintained initially at a low value. This, in turn, prevents the granular material of the filter bed 2 from being carried along and discharged with the outflow of water into the channel 5. In particular, the valve lid 9 precludes any grains within the layers of water below the top edge of the valve lid 9 from being carried out of the chamber 3 into the channel 5.

Figure 3:
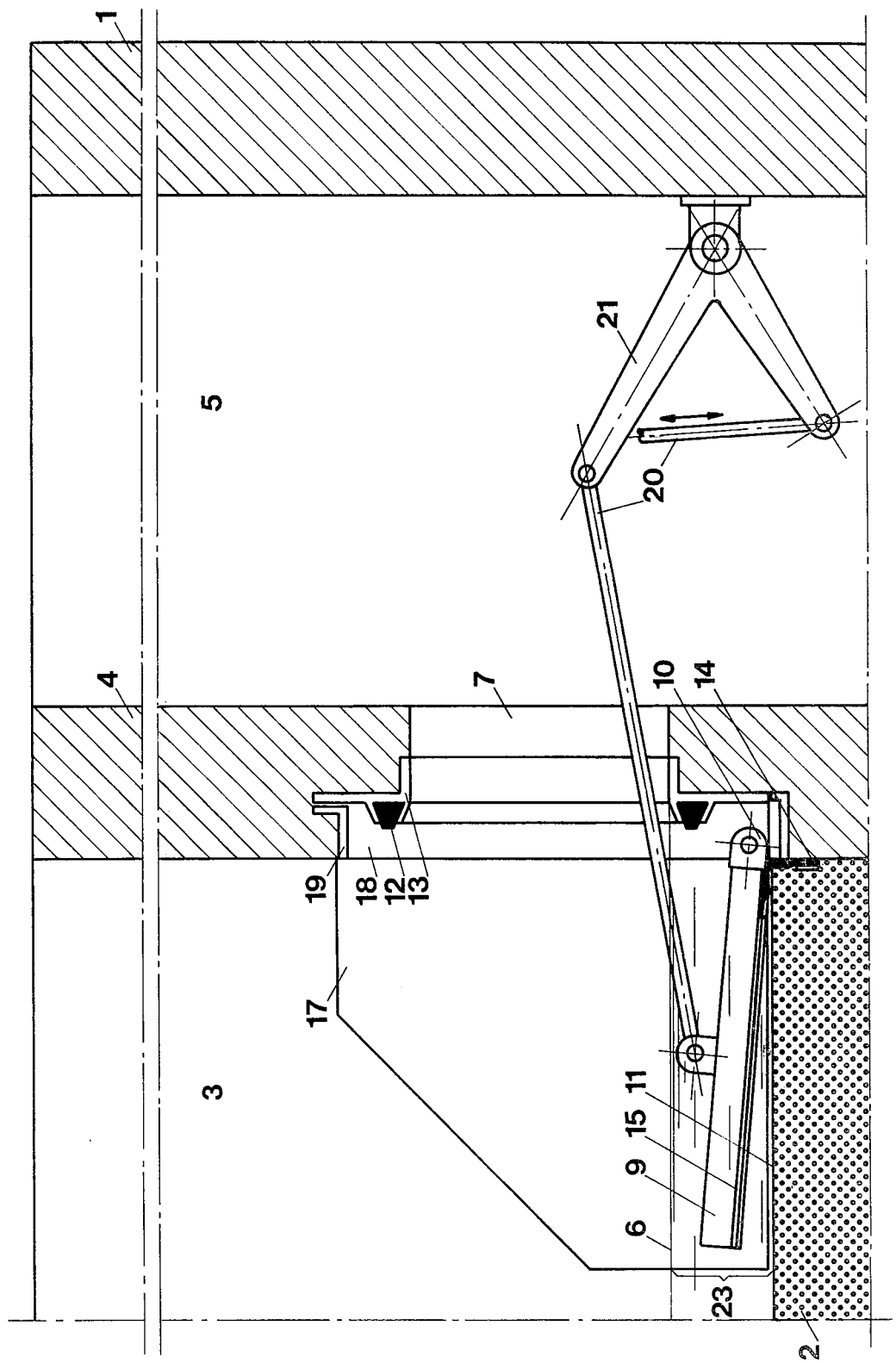
FIG. 3 illustrates a view similar to FIG. 1 with a valve lid in a fully opened position.

Subsequently, the control system causes further hinging of the valve lid 9 into a fully opened position as shown in FIG. 3. In this position, the valve 8 is fully opened and the lid 9 is substantially at the level 11 of the filter bed. 2. In this position of the valve 8, the water level 6 drops to the level of the lower edge of the opening 7. The height 23 of the water above the filter bed 2 is thus relatively small. At this time, a three-phase backwashing operation can be instituted.

The invention thus provides a filter system in which the height of the opening 7 above the filter bed 2 is at a minimum so that the height 23 of the water in the chamber 5 can be less than with the conventional sludge water valves. In this regard, the top edge of the valve lid 9, not the height of the opening 7, determines the free board which is present between the sludge water outlet and the level of the bed 2. The lid 9 also prevents discharge of the granular material of the filter bed 2 during emptying of the chamber 3.

It is to be noted that during backwashing, the impurities which are removed from the filter bed 2 are subsequently removed with the sludge water through the opening 7 into the discharge channel 5.

What is claimed is:

1. A backwashable filter system comprising
    a basin defining an excess head chamber and a sludge water discharge channel and having a wall separating said excess head chamber from said channel and an opening in said wall between said chamber and said channel;
    at least one granular filter bed in said basin below said chamber, said bed having an upper surface in a plane below said opening;
    a valve selectively closing said opening, said valve having a lid pivotally mounted on an axis extending at least substantially in said plane and along a bottom of said lid for pivoting between a position within said wall near said excess head chamber and in front of said opening and a position spaced from said wall; and
    means for sealing said lid laterally relative to said wall during movement of said lid from said opening to prevent lateral outflow of sludge water.

2. A backwashable filter system as set forth in claim 1 which further comprises means for hinging said lid about said axis in steps.

3. A backwashable filter system as set forth in claim 1 wherein said valve further includes a pivot on said axis for pivoting of said lid thereon.

4. A backwashable filter system as set forth in claim 3 which further comprises means for pivoting said lid on said pivot.

5. A backwashable filter system as set forth in claim 1 wherein said opening is rectangular in shape and extends along said wall.

6. In combination, a basin for a backwashable filter system, said basin having a wall separating an excess head chamber from a sludge water discharge channel and an opening in said wall between said chamber and said channel;

a valve for selectively closing said opening, said valve having a lid pivotally mounted on an axis extending along a bottom of said lid for pivoting between a position within said wall near said excess head chamber and in front of said opening and a position spaced from said wall; and means for sealing said lid laterally relative to said wall during movement of said lid from said opening to prevent lateral outflow of sludge water.

7. The combination as set forth in claim 6 which further comprises means for pivoting said lid on said axis.

8. The combination as set forth in claim 6 wherein said basin has a pair of side walls perpendicular to and integral with respective ends of said first wall and said means for sealing includes flexible seals along two opposite sides of said lid for sealingly contacting said respective side walls.

* * * * *

UNITED STATES PATENT AND TRADEMARK OFFICE
CERTIFICATE OF CORRECTION

PATENT NO. : 4,326,956

DATED : April 27, 1982

INVENTOR(S) : OTTO MULLER

It is certified that error appears in the above—identified patent and that said Letters Patent is hereby corrected as shown below:

Column 1, line 54, change "requirements" to --requirement--

Signed and Sealed this

Tenth Day of August 1982

[SEAL]

Attest:

GERALD J. MOSSINGHOFF

Attesting Officer

Commissioner of Patents and Trademarks